United States Patent
Kim

(12) 
(10) Patent No.: US 9,045,107 B2
(45) Date of Patent: Jun. 2, 2015

(54) AIRBAG DOOR

(71) Applicant: HYUNDAI MOBIS Co., Ltd., Yongin-si, Gyeonggi-do (KR)

(72) Inventor: Young Seok Kim, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/217,601

(22) Filed: Mar. 18, 2014

(65) Prior Publication Data
US 2014/0284904 A1   Sep. 25, 2014

(30) Foreign Application Priority Data
Mar. 21, 2013 (KR) .................. 10-2013-0030474

(51) Int. Cl.
*B60R 21/2165* (2011.01)
*B60R 21/215* (2011.01)

(52) U.S. Cl.
CPC ... *B60R 21/2165* (2013.01); *B60R 2021/21537* (2013.01)

(58) Field of Classification Search
CPC .................. B60R 21/2165; B60R 2021/21537
USPC ..................................................... 280/728.3
See application file for complete search history.

(56) References Cited

U.S. PATENT DOCUMENTS

| | | | | |
|---|---|---|---|---|
| 4,148,503 | A  * | 4/1979 | Shiratori et al. | 280/731 |
| 5,582,424 | A  * | 12/1996 | Okuyama et al. | 280/728.3 |
| 6,247,722 | B1 * | 6/2001 | Brodi et al. | 280/728.3 |
| 6,267,918 | B1 * | 7/2001 | Bauer | 264/400 |
| 6,692,018 | B2 * | 2/2004 | Jenkins et al. | 280/728.3 |
| 6,808,197 | B2 * | 10/2004 | Bauer et al. | 280/728.3 |
| 7,398,991 | B2 * | 7/2008 | Hayashi et al. | 280/728.3 |
| 7,661,698 | B2 * | 2/2010 | Yamada et al. | 280/728.3 |
| 7,673,896 | B2 * | 3/2010 | Yamada et al. | 280/728.3 |
| 7,919,036 | B2 * | 4/2011 | Bauer et al. | 264/400 |
| 7,988,184 | B2 * | 8/2011 | Fukawatase et al. | 280/728.3 |
| 2001/0010423 | A1 * | 8/2001 | Bauer et al. | 280/728.3 |
| 2002/0030352 | A1 * | 3/2002 | Iida et al. | 280/728.3 |
| 2003/0107203 | A1 * | 6/2003 | Bauer et al. | 280/728.3 |
| 2004/0160043 | A1 * | 8/2004 | Litjens et al. | 280/732 |
| 2007/0207233 | A1 * | 9/2007 | Bauer et al. | 425/141 |
| 2008/0106076 | A1 * | 5/2008 | Sella et al. | 280/728.3 |
| 2010/0123299 | A1 * | 5/2010 | Fukawatase et al. | 280/728.3 |

* cited by examiner

*Primary Examiner* — Karen Beck
(74) *Attorney, Agent, or Firm* — Sherr & Jiang, PLLC

(57) ABSTRACT

Disclosed is an airbag door including: a panel which has tear lines, in which the tear lines include: a first tear line which is extended in a left and right direction of the panel; second tear lines which are extended from left and right end portions of the first tear line in an up and down direction of the panel, respectively; and third tear lines which are extended from upper and lower end portions of the second tear lines toward corners of the panel, respectively, thereby preventing an airbag from being torn by broken parts of the panel of the airbag door when the airbag is deployed.

9 Claims, 4 Drawing Sheets

AIRBAG DOOR

CROSS-REFERENCE TO RELATED APPLICATIONS

The present application claims priority to Korean Patent Application Number 10-2013-0030474 filed Mar. 21, 2013, the entire contents of which the application is incorporated herein for all purposes by this reference.

TECHNICAL FIELD

The present invention relates to an airbag door, and more particularly, to an airbag door for a vehicle in which tear lines, which may be broken when an airbag is deployed, are formed so that the airbag may be inflated and deployed forward at the time of a vehicle collision.

BACKGROUND

In general, various safety devices for protecting a driver and occupants are provided in a vehicle so as to prepare for an unexpected situation that may occur at uncertain moments, and as the representative safety devices, there are airbag devices for directly protecting the driver and the occupant who are seated on front seats in the vehicle.

At the time of a vehicle collision, the airbag device serves to protect the occupant from a front glass of the vehicle and oncoming objects in a manner in which compressed air is instantaneously fed into an airbag, and then the airbag is inflated and deployed toward the occupant at a high speed.

Meanwhile, the airbag inflated by the compressed air expands to the outside while tearing an airbag door that is installed in front of the airbag. In this case, there is a problem in that when the airbag expands, the airbag is torn by being caught by an edge of a torn part of the airbag door, and as a result, the airbag cannot perform its own function.

SUMMARY

The present invention has been made in an effort to provide an airbag door capable of preventing an airbag from being torn by a broken part of the airbag door when the airbag is deployed.

An exemplary embodiment of the present invention provides an airbag door which is disposed in front of an airbag, the airbag door including: a panel which has tear lines that are broken when the airbag is deployed, in which the tear lines include: a first tear line which is formed in a left and right direction of the panel; second tear lines which are extended from left and right end portions of the first tear line in an up and down direction of the panel, respectively; and third tear lines which are extended from upper and lower end portions of the second tear lines toward corners of the panel, respectively.

A hinge line may be formed on the panel, and broken parts of the panel may be rotated about the hinge line when the panel is broken.

Fourth tear lines, which overlap corner portions of the hinge line, may be formed at end portions of the third tear lines.

A depth of a groove of the first tear line may be greater than a depth of a groove of at least one of the second and third tear lines, and a width of the groove of the first tear line may be greater than a width of a groove of at least one of the second and third tear lines.

The second tear line may be formed to form an inclination angle of 90° to 120° with respect to the first tear line, and the third tear line may be formed to form an inclination angle of 120° to 160° with respect to the first tear line.

The third tear line may be formed to form an inclination angle of 30° to 60° with respect to the second tear line.

Widths of the grooves of the tear lines may be gradually decreased from a center of the first tear line toward end portions of the third tear lines, and depths of the grooves of the tear lines may be gradually decreased from the center of the first tear line toward the end portions of the third tear lines.

A depth of a groove of at least one of the first, second, and third tear lines may be gradually decreased toward an end portion of at least one of the first, second, and third tear lines, and a width of a groove of at least one of the first, second, and third tear lines may be gradually decreased toward an end portion of at least one of the first, second, and third tear lines.

According to the airbag door according to the present invention, the airbag is prevented from being torn by the broken tear lines of the airbag door when the airbag is deployed and inflated, such that the airbag is deployed according to a design thereof, thereby protecting an occupant.

The effects of the present invention are not limited to the aforementioned effects, and other effects, which are not mentioned above, will be clearly understood by those skilled in the art from the claims.

DETAILED DESCRIPTION

Figure 1:
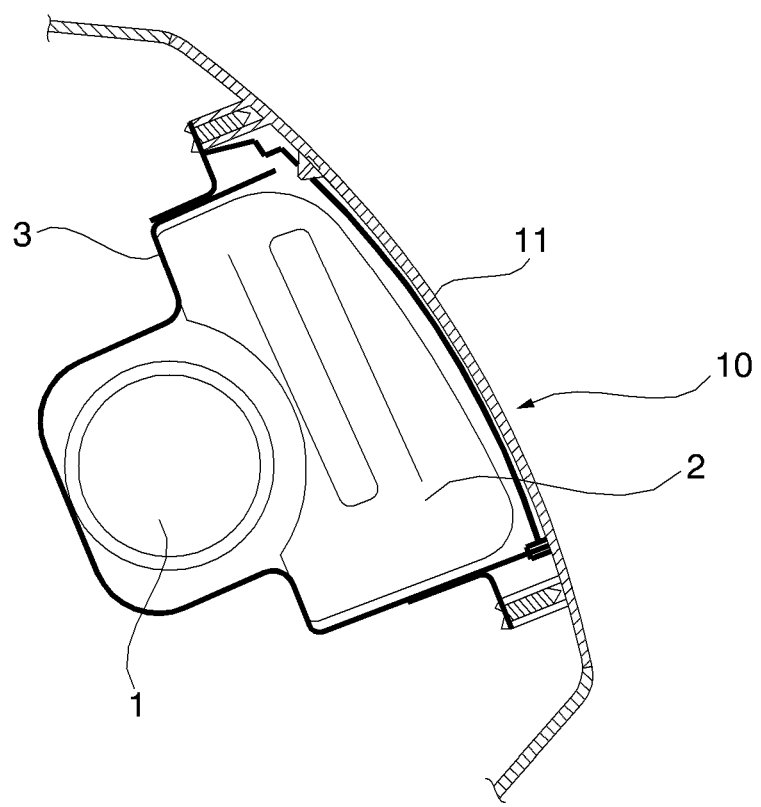
FIG. 1 is a cross-sectional view illustrating an airbag device in which an airbag door according to an exemplary embodiment of the present invention is installed.

Advantages and features of the present invention and methods of achieving the advantages and features will be clear with reference to an exemplary embodiment described in detail below together with the accompanying drawings. However, the present invention is not limited to the exemplary embodiment disclosed below and may be implemented in various different forms.

The present exemplary embodiment is only for rendering the description of the present invention complete and providing a complete understanding of the scope of the invention to a person with ordinary skill in the art to which the present invention pertains, and the present invention will only be defined by the scope of the claims. Like reference numerals indicate like elements throughout the specification.

Hereinafter, the present invention will be described with reference to the drawings in which the exemplary embodiment of the present invention is illustrated.

The exemplary embodiment of an airbag door may be modified by a person with ordinary skill in the art to which the present invention pertains.

Figure 2:
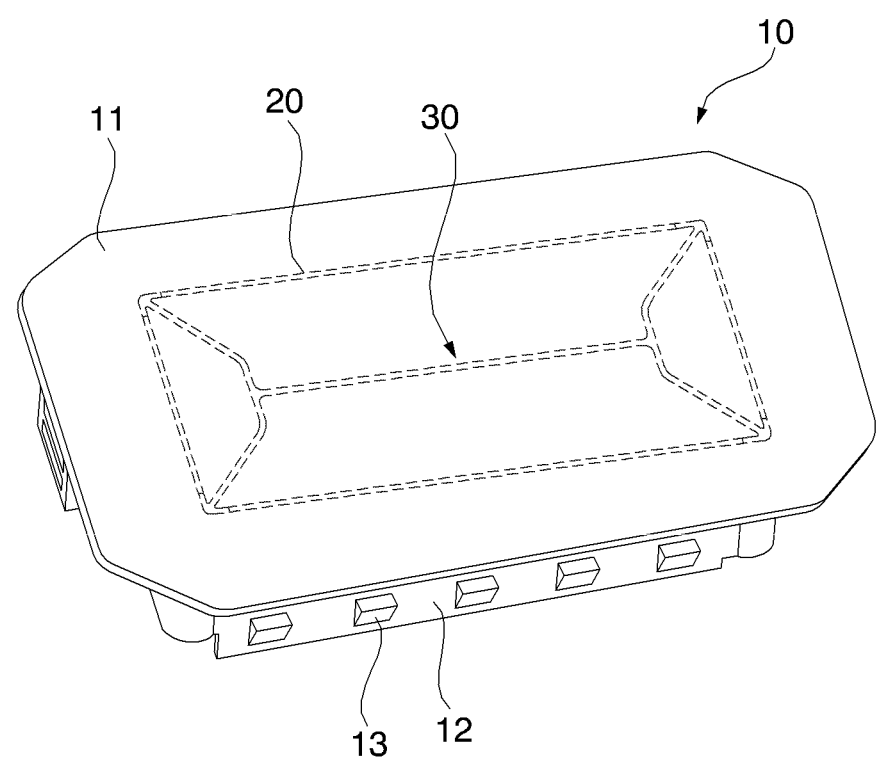
FIG. 2 is a perspective view of the airbag door according to the exemplary embodiment of the present invention.
Figure 3:
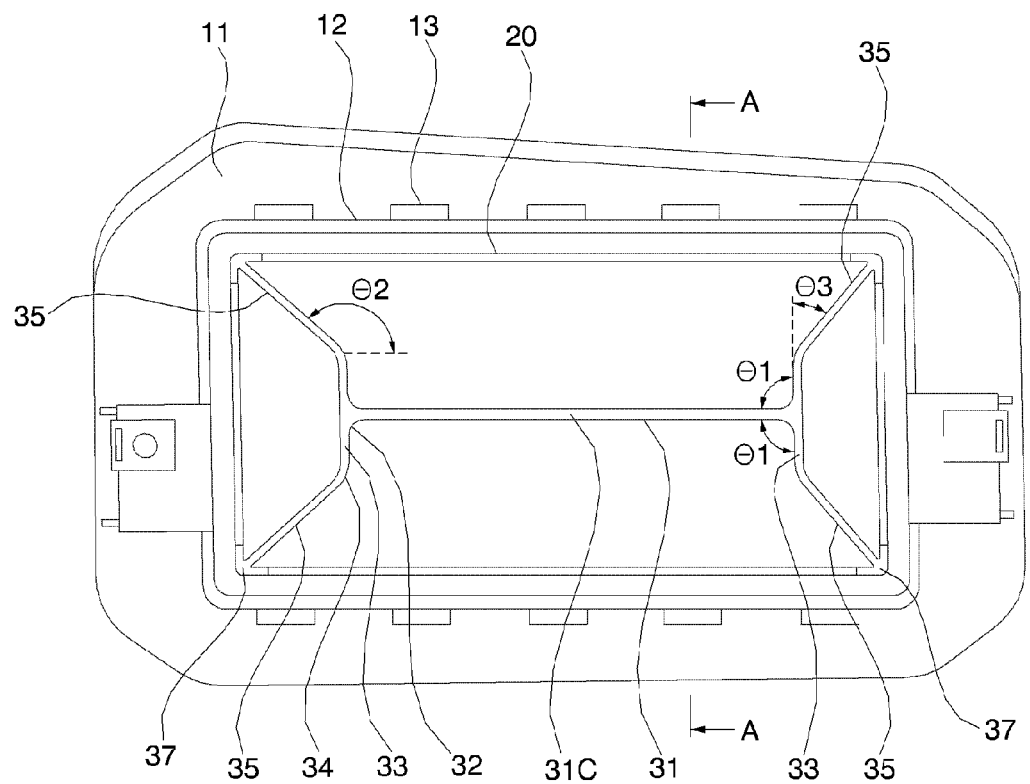
FIG. 3 is a rear side view of the airbag door illustrated in FIG. 2.
Figure 4:
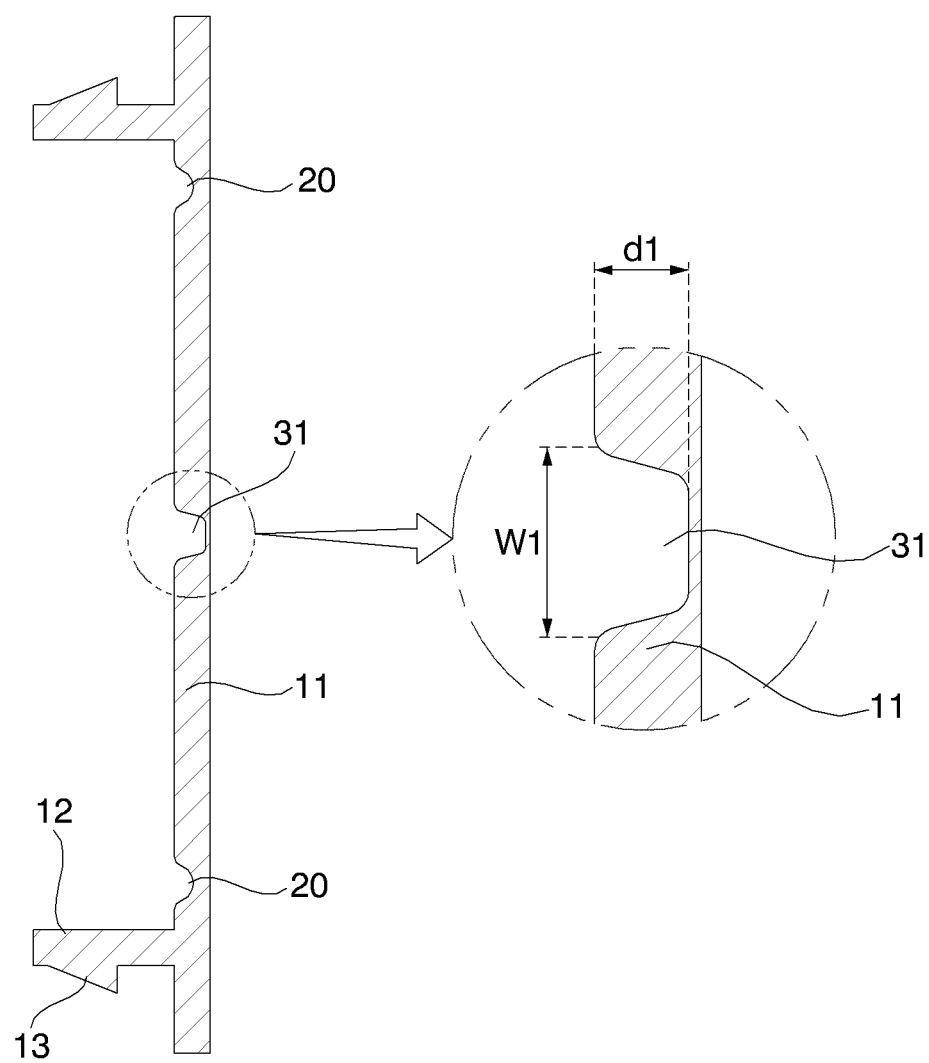
FIG. 4 is a cross-sectional view taken along line A-A of FIG. 3.

Referring to FIGS. 1 to 3, an airbag device for a vehicle includes an airbag 2, an inflator 1 which inflates the airbag 2 so that the airbag 2 is deployed when an external impact occurs, an airbag housing 3 which accommodates the inflator 1 and the airbag 2, and an airbag door 10 which is coupled to the airbag housing 3 so as to be positioned in front of the airbag 2, and has a panel 11 that is broken when the airbag is inflated so that the airbag is deployed toward an occupant.

The airbag door 10 includes the panel 11 having a quadrangular shape, and a leg portion 12 which protrudes downward from a rear surface of the panel 11, hook portions 13 are formed on the leg portion 12 so as to be coupled with the airbag housing 3, and a hinge line 20 and tear lines 30 are formed on the rear surface of the panel 11.

The tear line 30 is formed as an elongated groove that is recessed in the rear surface of the panel and has a predetermined depth and a predetermined width, such that the panel 11 may be broken due to expansive force of the airbag 2 when the airbag 2 is deployed.

The hinge line 20 allows broken parts of the panel 11 to be rotated about the hinge line 20 in a case in which the tear lines 30 are broken, thereby preventing the broken parts of the panel 11 from being separated from the airbag device.

Therefore, the hinge line 20 is formed so as not to be broken when the airbag 2 is deployed.

The hinge line 20 may be formed in a rectangular shape.

The tear lines 30 include: a first tear line 31 which is spaced apart from upper and lower sides and left and right sides of the panel 11 toward an inner side of the panel 11, and formed in a left and right direction of the panel 11; second tear lines 33 which are extended from left and right end portions of the first tear line 31 in an up and down direction of the panel 11, respectively; and third tear lines 35 which are extended from upper and lower end portions of the second tear lines 50 toward corners of the panel 11, respectively.

In addition, fourth tear lines 37, each of which has a shape that is bent at an angle of 90° so as to overlap each corner portion of the hinge line 20, may be formed at end portions of the third tear lines 35.

In addition, portions 32 where the left and right end portions of the first tear line 31 are connected with the second tear lines 33 may be formed to be rounded, and portions 34 where the upper and lower end portions of the second tear lines 33 are connected with the third tear lines 35 may also be formed to be rounded.

Although FIGS. 2 and 3 illustrate a configuration in which the first tear line 31 is formed at a center of the panel 11, the first tear line 31 may be formed to be more adjacent to any one of the upper and lower sides of the panel 11 of the airbag door.

A depth d1 of a groove of the first tear line 31 may be greater than depths of the grooves of the second and third tear lines 33 and 35, and a width W1 of the groove of the first tear line 31 may be greater than widths of the grooves of the second and third tear lines 33 and 35.

As described above, since the depth d1 of the groove of the first tear line 31 is greater than the depths of the grooves of the second and third tear lines 33 and 35, or since the width W1 of the groove of the first tear line 31 is greater than the widths of the grooves of the second and third tear lines 33 and 35, the first tear line 31 is first broken when the tear lines 30 are broken, and thereby the panel 11 may be smoothly broken.

In addition, among the first, second, and third tear lines 31, 33, and 35, the first tear line 31 may have the deepest groove, the third tear line 35 may have the shallowest groove, the first tear line 31 may have the widest groove, and the third tear line 35 may have the narrowest groove.

In addition, the depths or the widths of the grooves of the first, second, and third tear lines 31, 33, and 35 may be gradually decreased from a center 31c of the first tear line 31 toward the fourth tear lines 37.

In addition, the depth or the width of the groove of at least one of the first, second, and third tear lines 31, 33, and 35 may be gradually decreased toward the end portion of at least one of the first, second, and third tear lines 31, 33, and 35.

Based on the first tear line 31, the second tear line 33 may be formed to have an inclination angle θ1 of 90° to 120° with respect to the first tear line 31.

Meanwhile, in a case in which the second tear line 33 has an inclination angle below 90° with respect to the first tear line 31, the airbag may be damaged by edges of the first and second tear lines 31 and 33 when the airbag 2 is deployed, and in a case in which the second tear line 33 has an inclination angle above 120° with respect to the first tear line 31, a triangular edge may be formed at an intermediate position of the second tear line 33, which may cause damage to the airbag.

A length of the second tear line 33 may be shorter than those of the first and third tear lines 31 and 35.

The third tear lines 35 may include four tear lines that are extended from the upper and lower end portions of the pair of second tear lines 33 toward the respective corners of the hinge line 20.

The four third tear lines 35 may be formed to be symmetric with respect to each other in the up and down direction or the left and right direction.

In addition, the third tear line 35 may be formed to form an inclination angle θ2 of 120° to 160° with respect to the first tear line 31, or an inclination angle θ3 of 30° to 60° with respect to the second tear line 33.

An operation of the airbag for a vehicle according to the exemplary embodiment of the present invention will be briefly described below.

At the time of a vehicle collision, an airbag control unit (not illustrated) receives an impact value from a sensor for sensing impulse according to the vehicle collision.

Thereafter, when the impact value satisfies a condition required to deploy the airbag 2, the airbag control unit operates and controls the inflator 1 so that gas or air is supplied into the airbag 2.

In this case, expansive force of the airbag 2, which expands depending on the operation of the inflator 1, is applied to the airbag door 10, such that the first, second, and third tear lines 31, 33, and 35 formed on the panel 11 are broken, and broken parts of the panel 11 are rotated about the hinge line 20 toward the interior of the vehicle.

Meanwhile, since the depths or the widths of the grooves of the first, second, and third tear lines 31, 33, and 35 are different from each other, the first, second, and third tear lines 31, 33, and 35 may be sequentially and smoothly broken.

In addition, the broken parts of the panel 11 do not form a sharp angle because of the second tear lines 33, thereby preventing the airbag from being torn when the airbag is deployed.

While the exemplary embodiment of the present invention has been illustrated and described above, the present invention is not limited to the aforementioned specific exemplary embodiment, and various modifications may be made by a person with ordinary skill in the art to which the present invention pertains without departing from the subject matters of the present invention which are claimed in the claims, and these modifications should not be appreciated individually from the technical spirit or prospect of the present invention.

What is claimed is:

1. An airbag door which is positioned in front of an airbag, the airbag door comprising:
 a panel which has tear lines that are broken when the airbag is deployed, wherein the tear lines include:
a first tear line which is extended in a left and right direction of the panel;
second tear lines which are extended from left and right end portions of the first tear line in an up and down direction of the panel, respectively; and
third tear lines which are extended from upper and lower end portions of the second tear lines toward corners of the panel, respectively,
wherein a width of a groove of the first tear line is greater than a width of a groove of at least one of the second and third tear lines.

2. The airbag door of claim 1, further comprising a hinge line formed on the panel and having a rectangular shape surrounding the first, second, and third tear lines, wherein broken parts of the panel are rotated about the hinge line when the panel is broken.

3. The airbag door of claim 2, wherein the tear lines further includes fourth tear lines each formed at a corner portions of the hinge line to overlap the corner portion and each having an angled shape, wherein the third tear lines are connected with the fourth tear lines.

4. The airbag door of claim 1, wherein a depth of a groove of the first tear line is greater than a depth of a groove of at least one of the second and third tear lines.

5. The airbag door of claim 1, wherein the second tear line is formed to form an angle of 90° with respect to the first tear line.

6. The airbag door of claim 1, wherein a length of the second tear line is shorter than a length of the third tear line.

7. The airbag door of claim 1, wherein widths of grooves of the tear lines are gradually decreased from a center of the first tear line toward end portions of the third tear lines.

8. The airbag door of claim 1, wherein depths of grooves of the tear lines are gradually decreased from a center of the first tear line toward end portions of the third tear lines.

9. The airbag door of claim 1, wherein a depth of a groove of at least one of the first, second, and third tear lines is gradually decreased toward an end portion of at least one of the first, second, and third tear lines.

* * * * *